United States Patent [19]
Moran

[11] Patent Number: 5,702,307
[45] Date of Patent: Dec. 30, 1997

[54] PIVOTAL, SPHERICALLY SHAPED, MOTION SIMULATOR-WITH SHIFTING MEANS FOR CONTROLLING ITS' CENTER OF GRAVITY

[76] Inventor: Kristen G. Moran, 1957 E. Andreas Rd., Palm Springs, Calif. 92262

[21] Appl. No.: 625,842

[22] Filed: Apr. 11, 1996

[51] Int. Cl.$^6$ .................................................. A63G 1/12
[52] U.S. Cl. .......................... 472/47; 472/60; 472/130
[58] Field of Search ............................ 472/47, 59, 60, 472/130, 135; 434/55

[56] References Cited

U.S. PATENT DOCUMENTS

| | | | |
|---|---|---|---|
| 4,824,099 | 4/1989 | Rusu et al. | 472/47 X |
| 4,856,771 | 8/1989 | Nelson et al. | 472/60 X |
| 5,060,932 | 10/1991 | Yamaguchi | 272/36 |

*Primary Examiner*—Kien T. Nguyen

[57] ABSTRACT

A motion simulator in the form of a motorized skeletal sphere suspended from a gimbal platform. The skeletal sphere comprises two orbital tracks, each having contollable motorized ballasts devices with attachment mechanism to the orbital tracks. These tracks provide a predetermined path for the ballasts to travel on. The ballasts provide a shifting mechanism for controlling the center of gravitys' position from within the occupied sphere. The ballasts rotate the sphere on its' axis 360°, in a controlled and deliberate manner. Different positions of the rotating axis are provided by the use of a multi-pivotal platform, that suspends the sphere and allows it to rotate freely in a plurality of directions. Direction is determined by an occupant using a control device for the ballasts movement. An adjustable chair is provided for centering the occupant as close to the center of the sphere as is possible. A variable counter-weight is housed within the circumference of the sphere to off-set the weight of the occupant.

14 Claims, 11 Drawing Sheets

OPEN    CLOSED

FIG. 5A.

PIVOTAL, SPHERICALLY SHAPED, MOTION SIMULATOR-WITH SHIFTING MEANS FOR CONTROLLING ITS' CENTER OF GRAVITY

BACKGROUND

Field of Invention

This invention relates to the field of computer simulation hardware. Specifically, simulator use, platform design and the motion control devices use to move them.

BACKGROUND

Description of Prior Art

Present day simulators costing thousands and even millions of dollars don't have the capability of PHYSICALLY rotating its' occupant around in a controlled and deliberate manner. "Around" meaning 360° in any direction. In otherwords, they are limited in the amount of motion they can physically mimic. The present invention can mimic motion in any direction, making it more versatile and thus applicable to many formats. Up to this point in time creative efforts in the development of simulators has been mostly concentrated on the speed at which they can calculate information[2]. Since 1929 when a man named Link invented the first flight simulator, hydraulic pistons and servo actuators have been used to move the platforms on which they rest. Instead of using hydraulics and pivotal legs to move its' platform, the present invention uses motorized ballasts that travel along on orbital, current supplied tracks. The present day simulators mostly operate from a platform or surface that is for the most part stationary. These platforms in and of themselves are horizontal plains, with limited motion. They cannot rotate their occupants more than 90° in any direction. The present invention having a spherical shape in conjunction with the use of various pivotal hardware and multi-pivotal platforms, increase the range of motion manytimes over.

Without the ability to completely rotate the user in one of the present day simulators, the sense of, "flying or driving by the seat of your pants", cannot be as appreciated as well as in the present invention. The degree of thrill is not as good as it could be and neither is the simulation of reality when compared to the present invention. Stimulate as many, and as much of the bodys' senses when using a simulator, and in doing so you simulate reality to a higher degree.

The present invention mimics motion to a higher degree and provides that motion at a much smoother and controlled rate. The herky-jerky motion experienced when present day simulators change direction is replaced in the present invention by smooth shifting ballasts. These ballast devices are attached to orbital tracks surrounding the occupant, forming a skeletal sphere. The sphere is then suspended from a gimbal platform using various pivotal hardware. Instead of pushing and pulling the platform using hydraulic pistons, servo-motors, gears or pulleys, the present invention rolls the weight away from the center of gravity.

The present day simulators only trick the mind and body into believing that it has actually rotated them a full 360°. Using fast motion graphics that invert the images quickly and platforms that only rock the occupant in the general direction of the action on the viewing screen.

The present day simulators used for entertainment and education include but are not limited to: arcade amusement, sports applications, theme parks, airlines, NASA and the military. In the book, "Beyond the Limits", "Flight Enters the Computer Age", by Paul E. Cerruzi, he points out that eversince the first simulator invented in 1929 by a man named Link and up to the present time, all flight simulators still use hydraulics to move their platforms. Specifically mentioned in chapter 8, entitled "Simulation, Testing and Control".

In the 1995 edition of "Cyberspace Lexicon", "An Illustrated Dictionary", by Bob Cotton and Richard Oliver, there is shown under the headings of "simulation" and "virtual reality", the state of the art in simulators[2]. Specifically products put out by Namco Corp., W. Industries and also Hughes. Namcos' simulator is called "Air Combat" and used for entertainment whereas the "Concept 90" simulator made by Hughes is used to train Delta Airline pilots.

There is a simulator that resembles the present invention in appearance only. That is to say it comprises a series of rings or hoops connected by pivotal hardware. The rings do not have motorized ballasts connected to them, so they remain rings and not tracks like the present invention has. These simulators do not try and mimic the aerobatics of a plane or the manuevers of a land vehicle like the present invention does. Their simulation process involves the feeling of weightlessness only. Most are activated manually by someone using their armstrength to spin the occupant around in a free-style manner. At no time do these simulators act to coincide with prescribed motions of action on a viewing screen unless it is to float the user through an artificial enviorement. Again, weightlessness is all that is being simulated. No references found.

All the flight simulators heretofore known suffer from a number of disadvantages:

(a) Very expensive to own, operate and maintain.

(b) require large amounts of space, (c) limited to one format (d) limited range of platform motion.

(e) too heavy to move easily.

Objects and Advantages

Accordingly, besides the objectives and advantages of the spherical shaped simulator described in the above patent, several objectives and advantages of the present invention are;

(a) to provide to the general public and other concerns an affordable simulator.

(b) to provide a lite weight portable simulator thats easy to set up for use or fold up for storage.

(c) to provide a simulator that can mimic motion to a greater degree thus expanding the range of formats for which it can be applied to, while at the same time providing more thrills for the operator/occupant to enjoy.

(d) to provide a simulator that is technically speaking, very simple to maintain and operate.

(g) to provide an "arena" for the development of formats or programs not considered using present day simulators.

(f) to provide the best performance at the lowest cost.

(g) to provide the opportunity to as many people as possible, the closest simulation of actual flight in an airplane, in the comfort of ones' own living room.

Still further objects and advantages will become apparent from a consideration of the ensuing description and drawings.

DRAWING FIGURES

In the drawings, closely related figures have the same number but different alphabetic suffixes.

| Reference Numerals In Drawings |
|---|
| (10) motion control device (typ.) |
| (a) motion and track housing |
| (12) tracks |
| (14) receptacle |
| (a) receptacle |
| (15) plug |
| (a) plug |
| (16) rail |
| (a) rail |
| (20) braided metal contact |
| (a) braided metal contact |
| (24) guide (motor) |
| (26) electric motor (fwd/rev) |
| (28) traction tire |
| (a) traction tire |
| (b) traction tire |
| (c) traction tire |
| (30) free-spinning tire |
| (a) free-spinning tire |
| (b) free-spinning tire |
| (c) free-spinning tire |
| (32) ball-bearing ballast (typ.) |
| (33) motor to ballast coupling |
| (34) ballast linkage (typ.) |
| (36) service panel |
| (38) axel pin (typ.) |
| (40) inner motion control device |
| (44) locking pivotal clamp |
| (a) locking pivotal clamp |

-continued

| Reference Numerals In Drawings |
|---|
| (46) pivotal clamp |
| (a) pivotal clamp |
| (50) outer motion control device |
| (54) pivotal bearing assembly |
| (a) pivotal bearing assembly |
| (60a) gimbal support leg |
| (60b) gimbal support leg |
| (61) gimbal ring |
| (66) chair (removable) |
| (68) control stick |
| (70) CPU |
| (72) transformer |
| (74) powercord |
| (76) batteries |
| (80) rotating axis, 360° |
| (82) spherical hull |
| (84) pedestal |
| (86) rotational bearing (typ.) |
| (88) hatch |
| (90) hinge |
| (92) latch |
| (95) multi-port receptacle |
| (96) support bracket |
| (a) support bracket |
| (98) weighted sphere |
| (100) contact switch (typ.) |
| (102) Combination attitude sensor/override control and variable counter-weight. |
| (104) threaded pipe (counter-weight attachment) |

DESCRIPTION

FIGS. 1–5A

Figure 1:
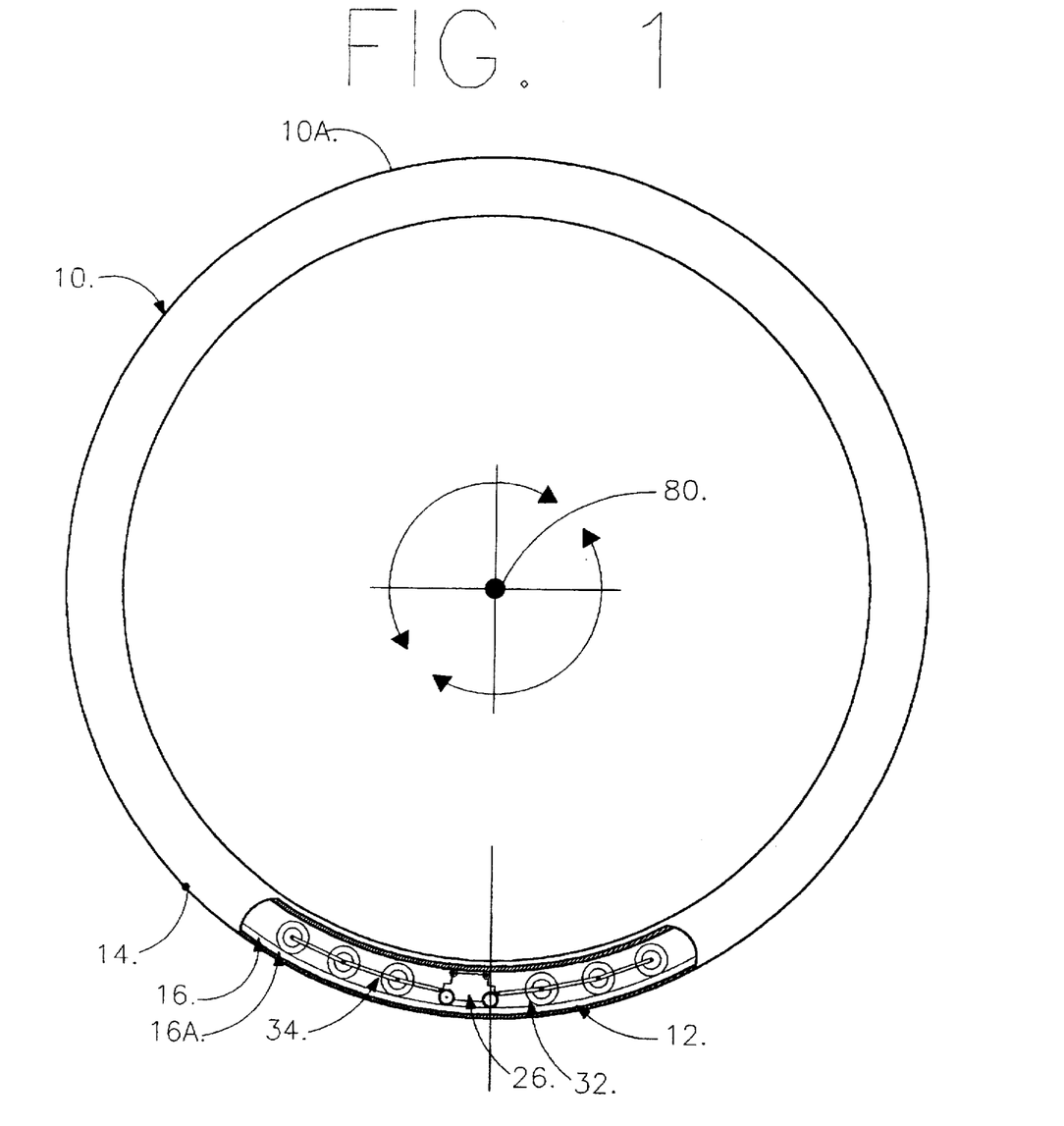
FIG. 1 is a version of the present inventions motion control device as viewed from the side, showing a cut away view of the motion devices' housing.
Figure 2:
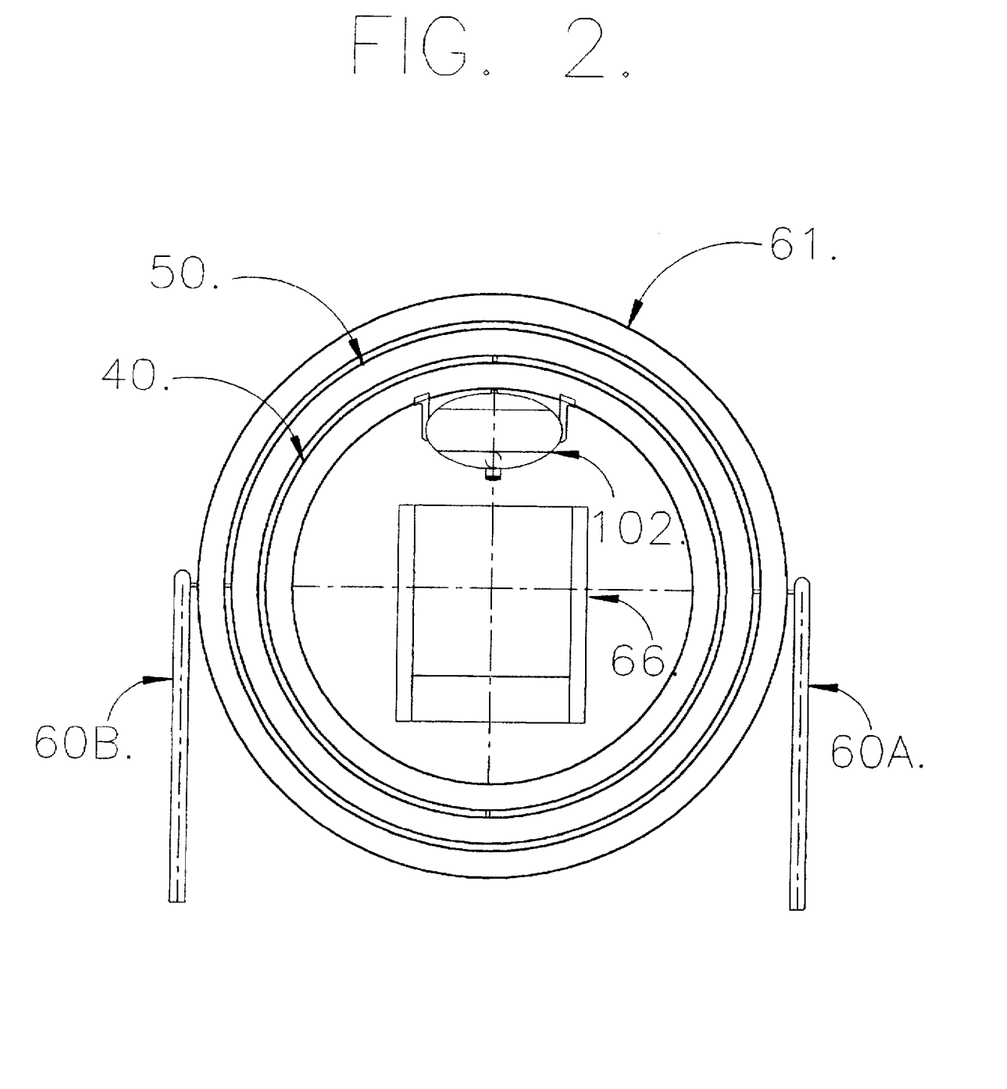
FIG. 2 is a perspective view of the present invention using a gimbal platform to support it. This is the preferred embodiment of the present invention.

FIG. 1 illustrates a version of a motion control device 10 that is like the motion control devices 40 and 50 used in the present invention, FIG. 2. This device 10 comprises a housing 10a that encompasses track 12. Track 12 comprises two current supplied rails 16 and 16a. Current is supplied to rails 16 and 16a thru a receptacle 14, located in housing 10a. A motor 26, is attached to ball-bearing ballasts 32, using coupling 33 and linkages 34. The motor 26 is able to move forward or backwards away from the center of gravity of device 10, enabling the device 10 to rotate 360° around its' axis 80. An access panel is provided for servicing.

Figure 1A:
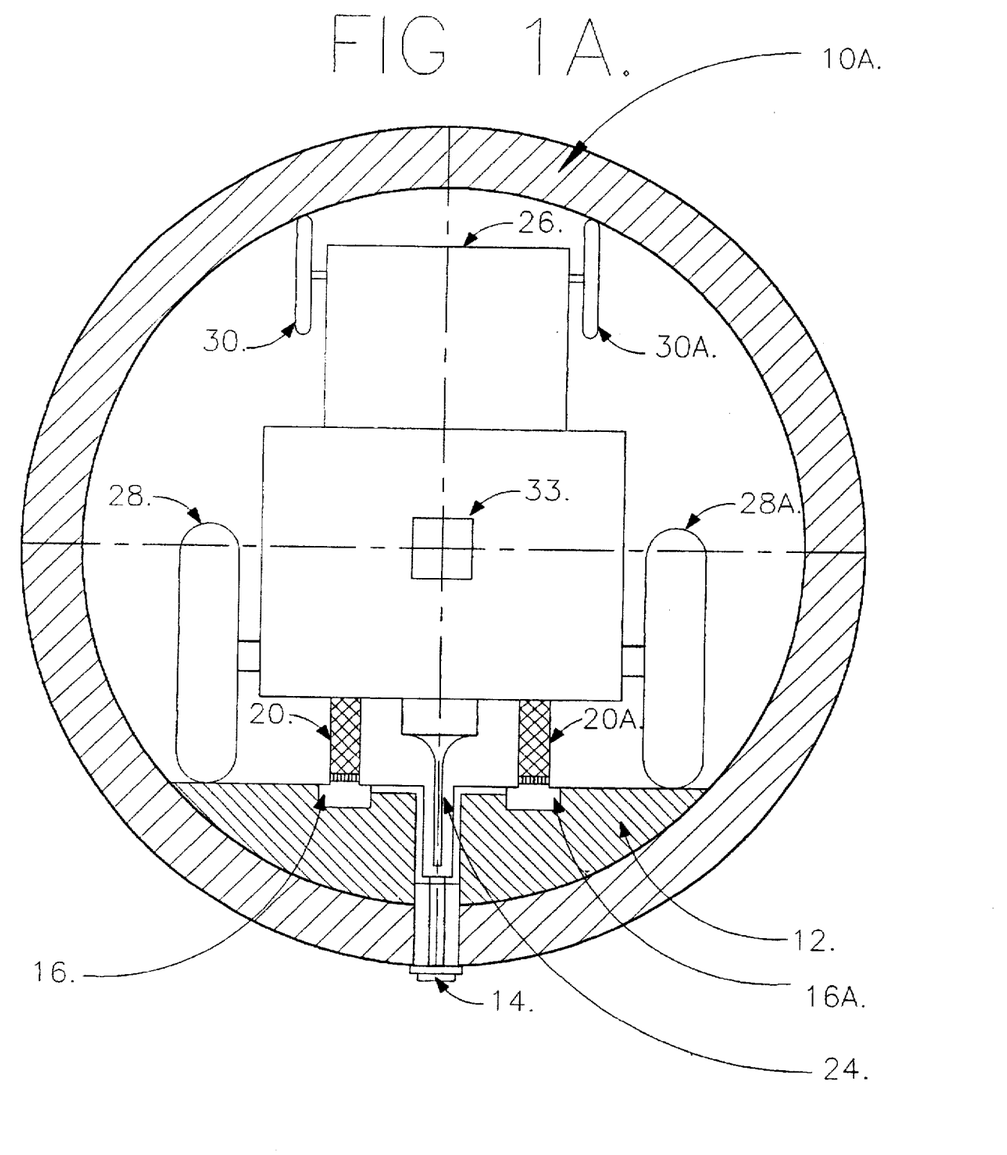
FIG. 1A is a cross-sectional view of the present inventions' orbital track and its' housing along with an end view of the ballasts' motor carriage.

FIG. 1A illustrates a cross section of track 12 and motor housing 10a of the present inventions motion control device. FIG. 1A also shows an end view of the ballast motor 26, which is held in place on the track 12 by a guide 24 and free-spinning tires 30, 30a, 30b, 30c. Current is supplied to motor 26 thru braided metal contacts 20 and 20a. These contacts 20 and 20a receive their current from rails 16 and 16a which are imbeded in track 12. Rubber tires 28, 28a, 28b, 28c provide traction for motor 26 on track 12. Rubber tires 30, 30a, 30b, 30c, are free-spinning and provide stability to motor 26. Receptacle 14, transfers current from CPU 70, FIG. 2A to rails 16 and 16a of track 12.

Figure 1B:
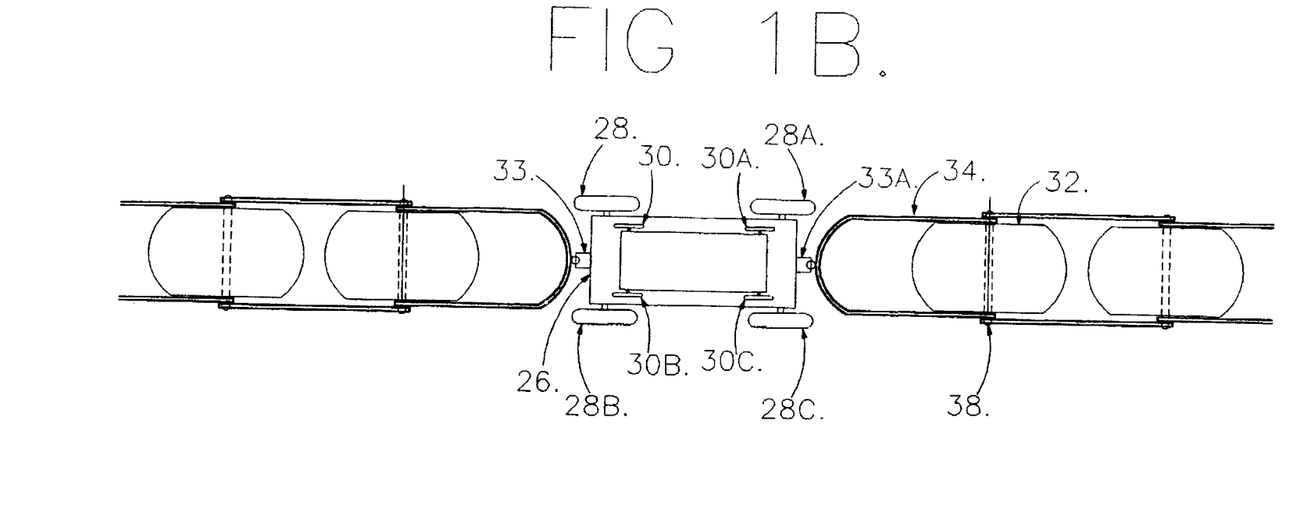
FIG. 1B is a side view of the present inventions' motorized ballast. (typ.)
Figure 1C:
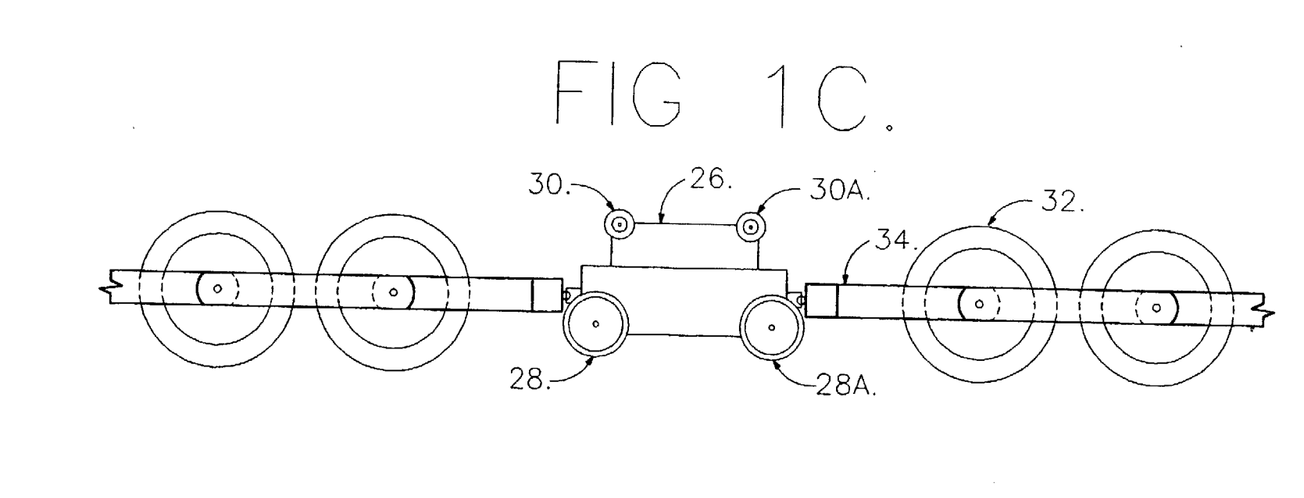
FIG. 1C is a top view of the present inventions' motorized ballast.

FIGS. 1B and 1C illustrates the linkages assembly 34, that is non-binding to housing 10a FIG. 1A. The linkages assembly 34, comprises a flat bar 34, with two holes for axel pins 38 that go thru ball-bearing ballast 32.

FIG. 2 shows a perspective view of the preferred embodiment of the present invention using a gimbal platform. Ring 61 is supported by legs 60a and 60b using bearing assemblies 54 and 54a FIG. 3. The gimbal ring 61 rotates 360° in a north/south or up/down direction in relation to chair 66. The motion control device 50 is responsible for this north/south motion of the present invention. The motion control device 40 is responsible for direction in a east/west or left/right direction. rection. It should be noted that the various configurations of motion control devices can be applied to any sphere causing it to move as configured.

Figure 2A:
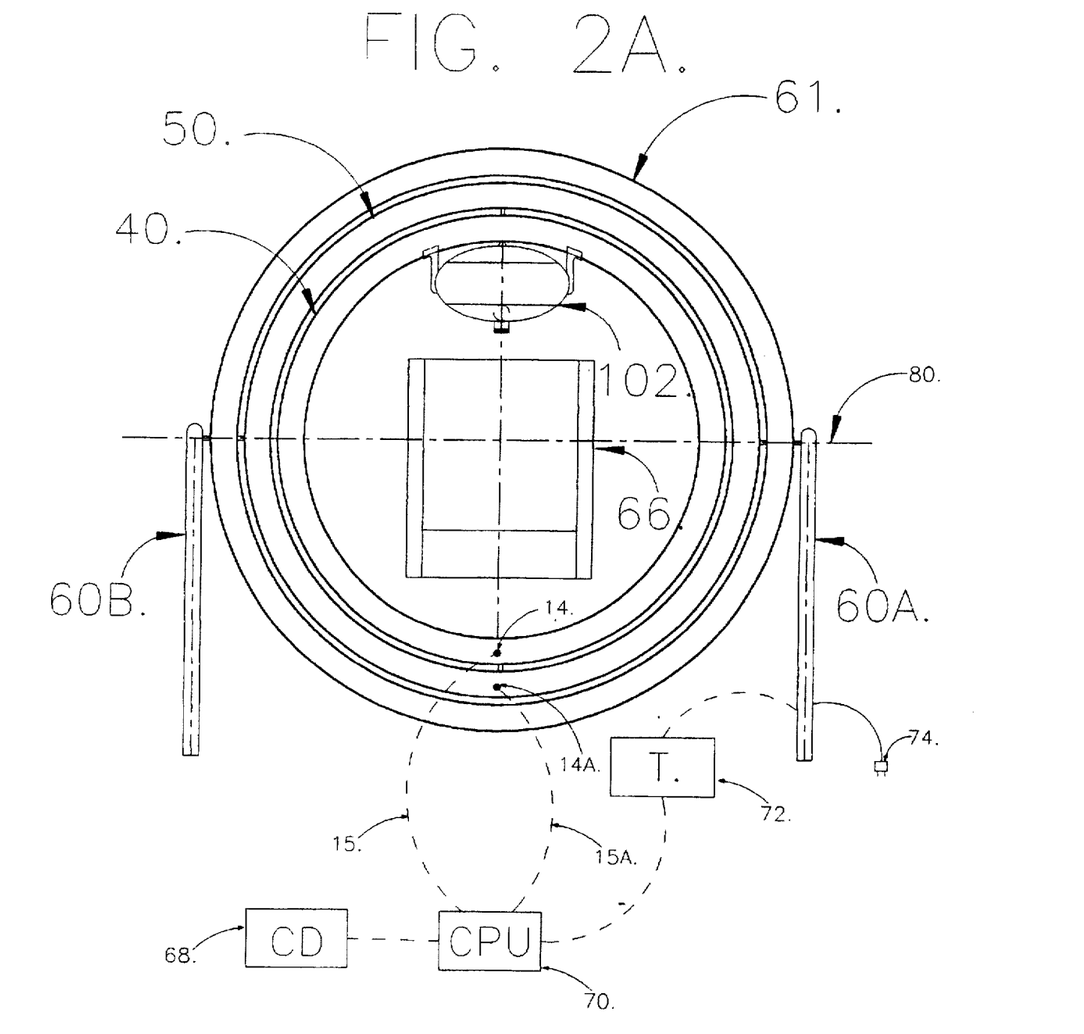
FIG. 2A is an exploded view of the preferred embodiment.

FIG. 2A illustrates an exploded view of the preferred embodiment of the present invention. Ring 61 is supported by legs 60a and 60b. Support 60b shows a power-cord 74 and a transformer 72, that is positioned under support 60b. Transformer 72 could be positioned elsewhere. The transformer 72 relays power to the CPU 70 and from the CPU 70 the power is supplied to motion control devices 40 and 50. A removable chair 66 for the occupant attaches to the skeletal framework created by the configuration of motion control devices 40 and 50. The control stick 68 that sends information to the CPU, controls the motion of the motorized ballasts, 26 and 32. The combination attitude sensor/ override control and variable counter-weight 102 is also attached to the skeletal framework of motion device 40 using support brackets 96 and 96a.

Figure 3:
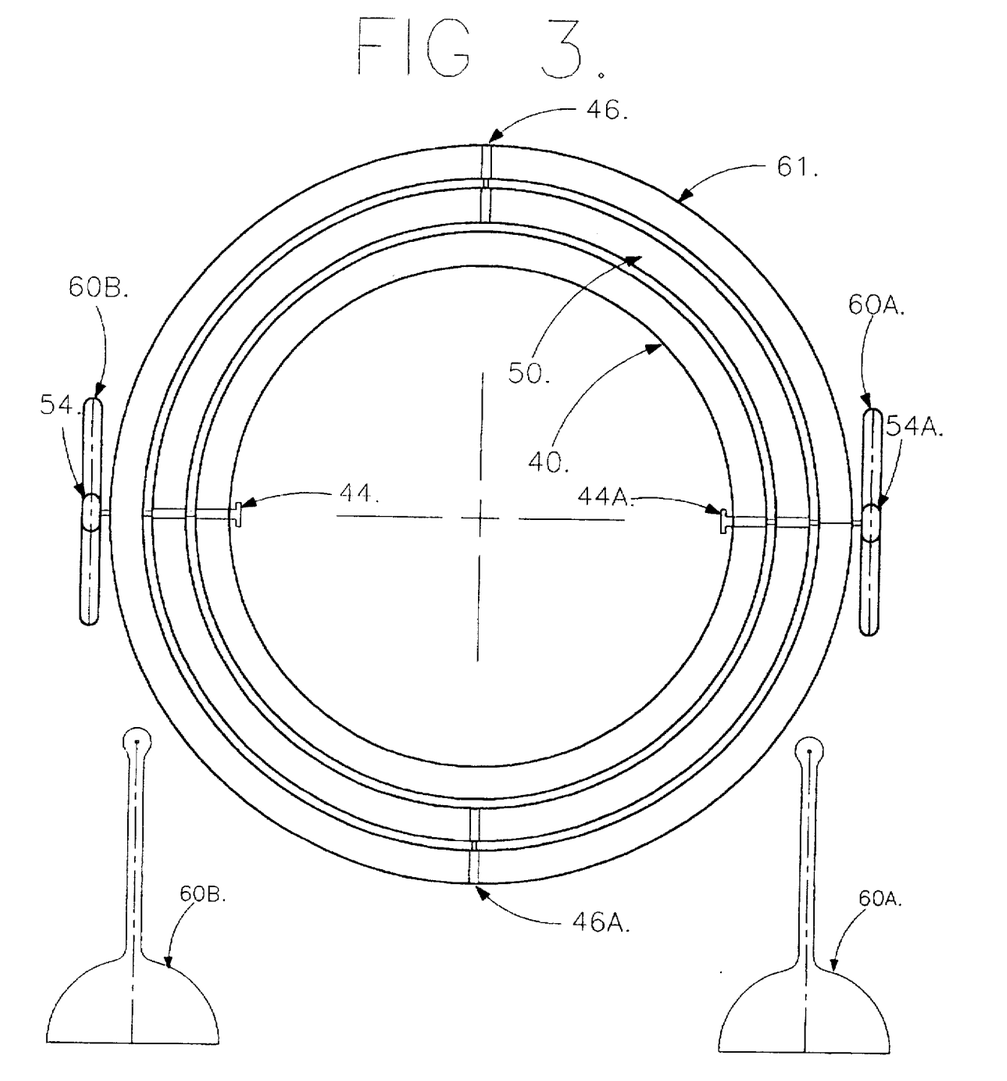
FIG. 3 illustrates the positioning of pivotal hardware along with showing the present inventions ability to be folded by for storage.

FIG. 3 illustrates the positioning of pivotal hardware 44, 44a, 46, 46a, 54, 54a. The inner motion control device 40 is attached to the outer motion control device 50 by locking pivotal hardware 44 and 44a. The outer motion control device 50 is connected to gimbal ring 61 by pivotal hardware 46 and 46a. Gimbal ring 61 is connected to leg supports 60a and 60b by pivotal bearing assembly 54 and 54a.

Figure 3A:
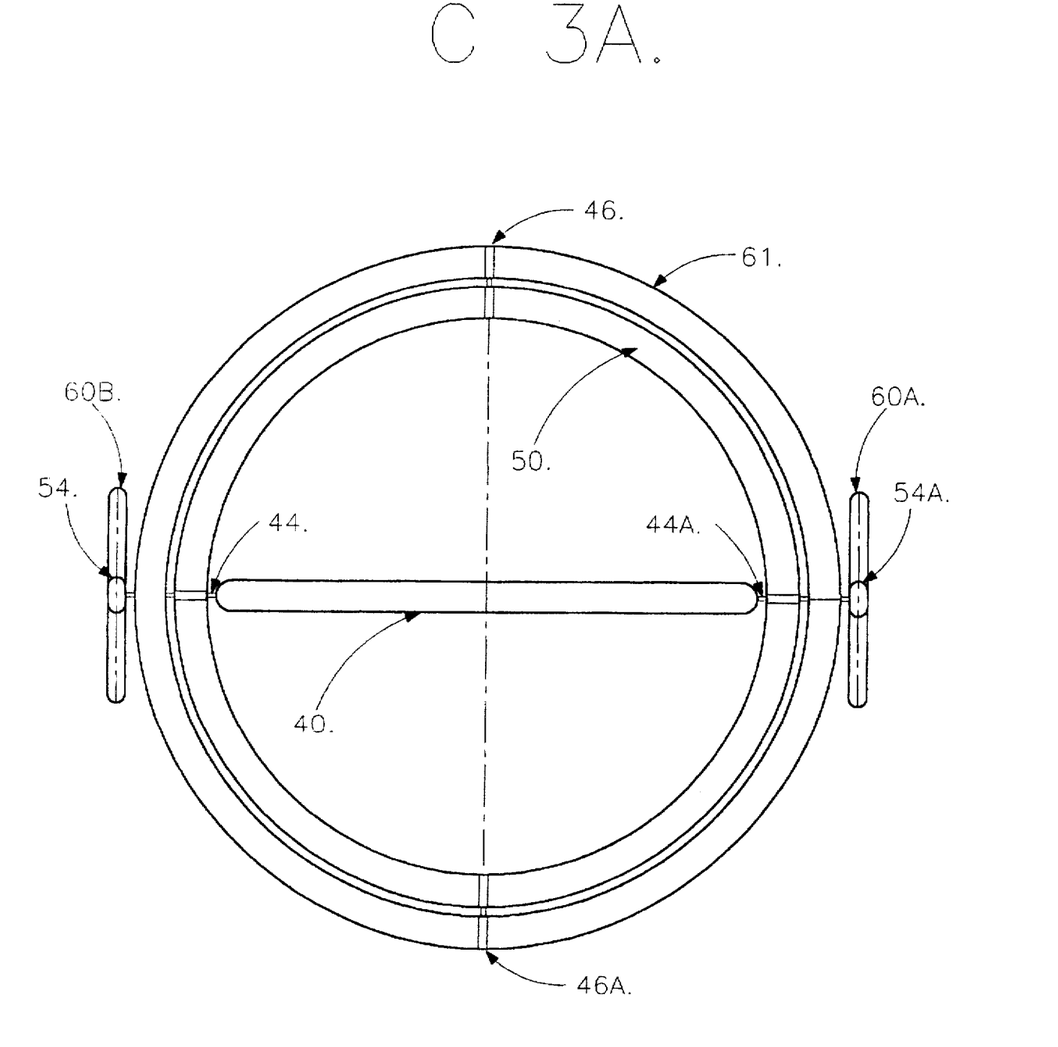
FIG. 3A shows the first stage of setting the present invention up for use, using the gimbal platform.

FIG. 3A illustrates the first stage of setting up the present invention for use. After support legs 60a and 60b are unfolded and locked in place, the inner motion control device can be unfolded to the point of when it becomes perpendicular to the outer motion control device 50. It is then locked in place by pivotal hardware 44 and 44a.

Figure 3B:
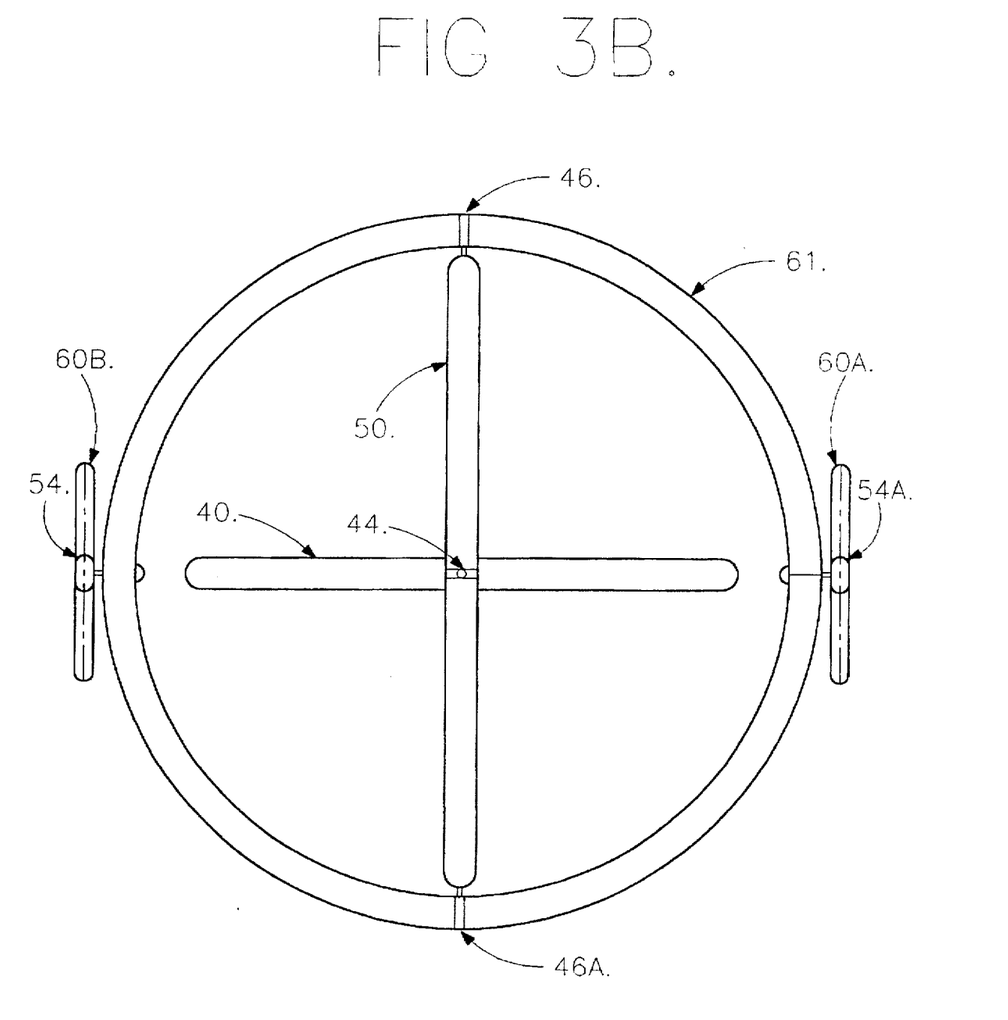
FIG. 3B shows the second stage of setting up the present invention for use, using the gimbal platform.

FIG. 3B illustrates the second stage in setting up the present invention for use. The outer motion control device 50 is allowed to swing into place perpendicular to gimbal ring 61 while being supported by hardware 46 and 46a which are pivotal.

Figure 4:
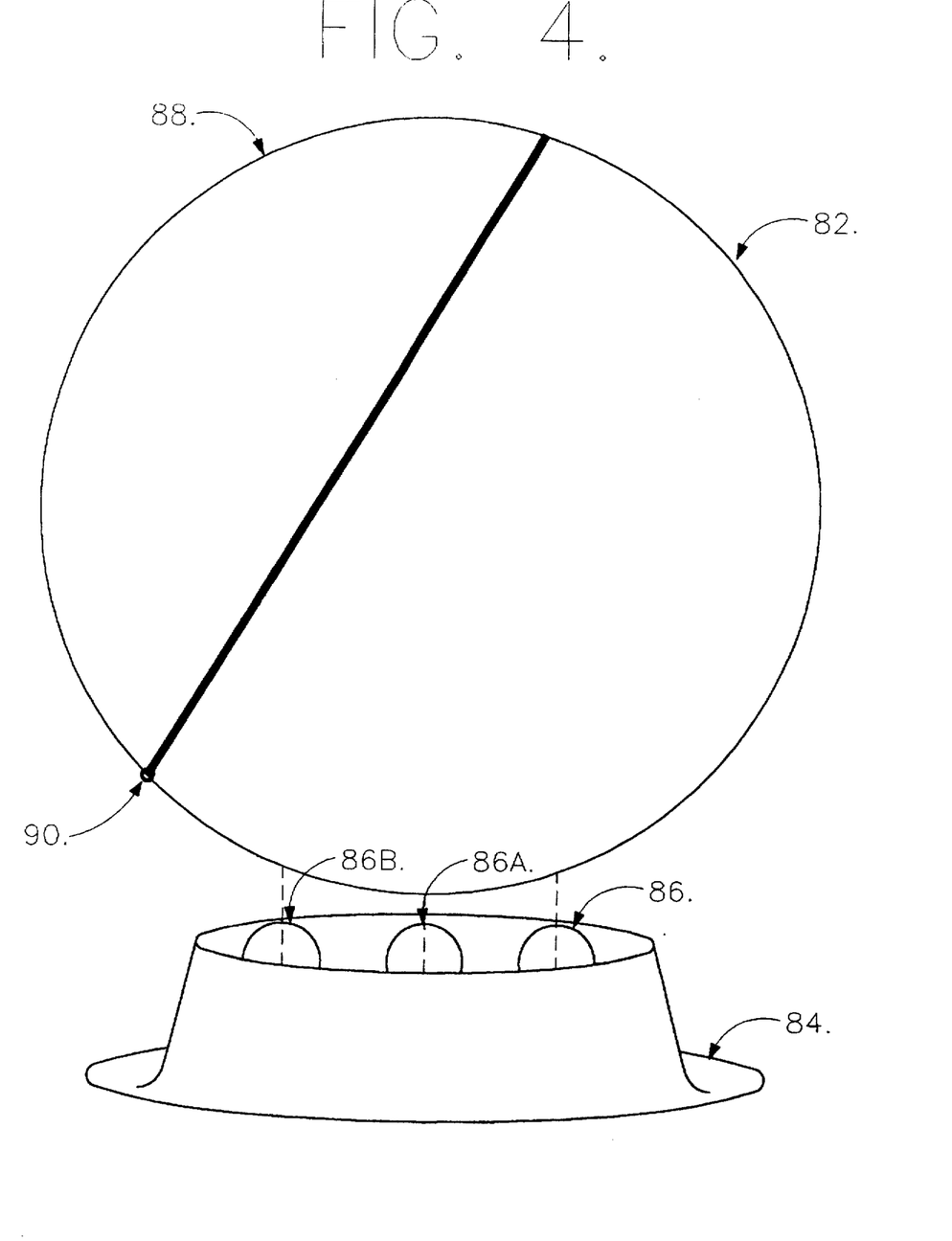
FIG. 4 is an exploded view of a version of the present invention using a hull and pedestal platform.

FIG. 4 shows another version of the present invention using a hull 82 and pedestal 84 platform instead of the gimbal platform. A hull 82 and hatch 88 are connected by a hinge 90 and latch 92. The outer motion control device 50 is attached to the inner circumference of the hull 82. Motion control device 40 is attached to motion control device 50 so that they remain perpindicular to one another. The spherical hull 82 is placed upon a pedestal 84 comprising a plurality of rotating ball-bearing 86, enabling the sphere to rotate in a plurality of directions a full 360°. It should be noted that the pedestal 84 of rotating bearings 86 could be replaced by a pedestal of air jets that provide a cushion of air for the sphere 82 to float upon and thus be able to rotate in a plurality of directions.

Figure 4C:
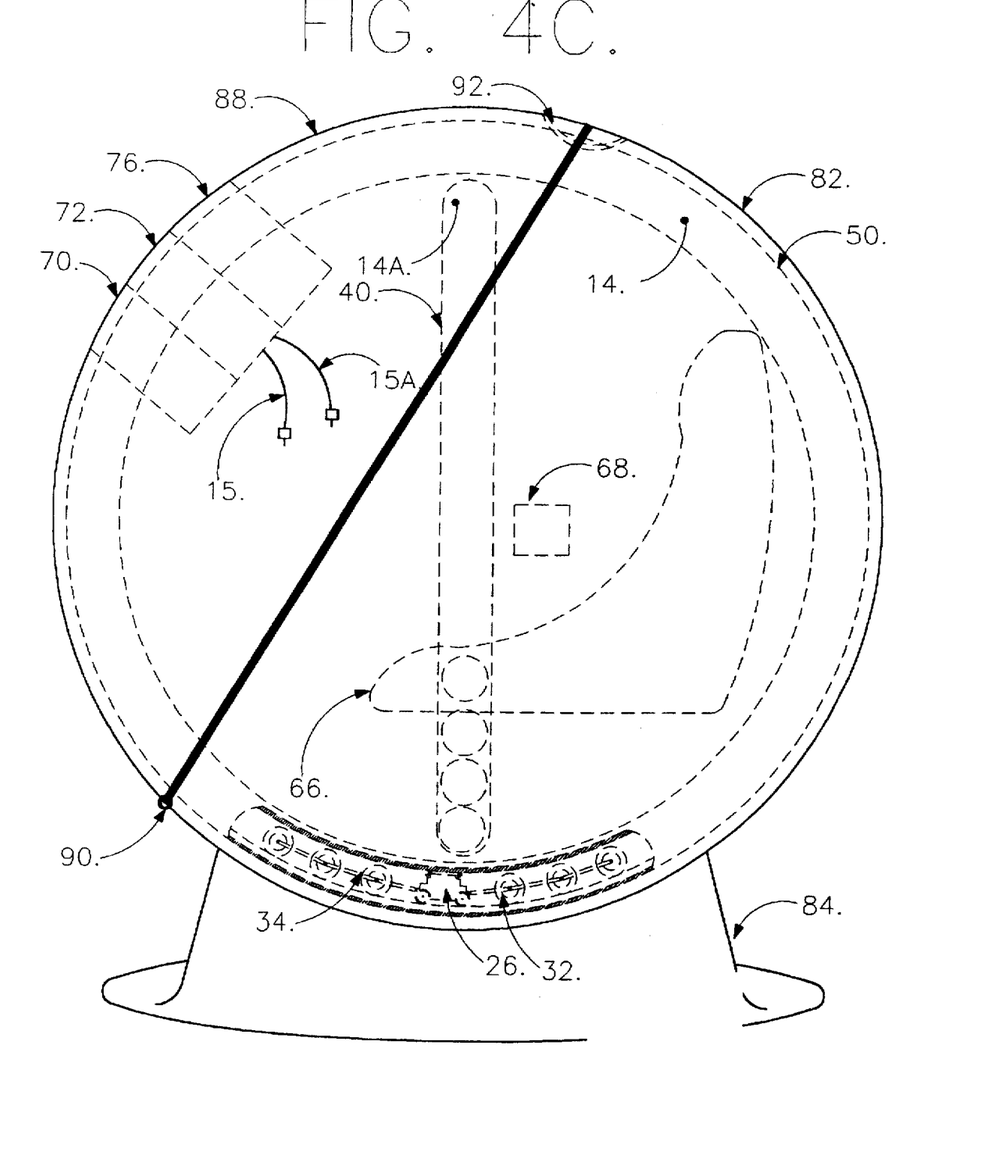
FIG. 4C is a side view of the present invention using the hull and pedestal platform. Hidden lines are used to show the embodiments of this version.

FIG. 4C illustrates the various hidden embodiments of the spherical hull platform 82 used with pedestal 84 of rotating bearings 86. This version may use batteries 76 in order to furnish this version with power. This version is viewed as the upscale model of the present invention.

Figure 5:
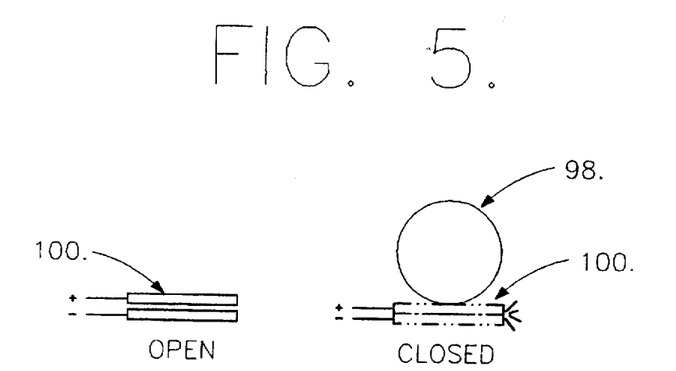
FIG. 5 illustrates a typical contact switch of the kind to be used in the operation of the present inventions combination attitude sensor/override control device.
Figure 5A:
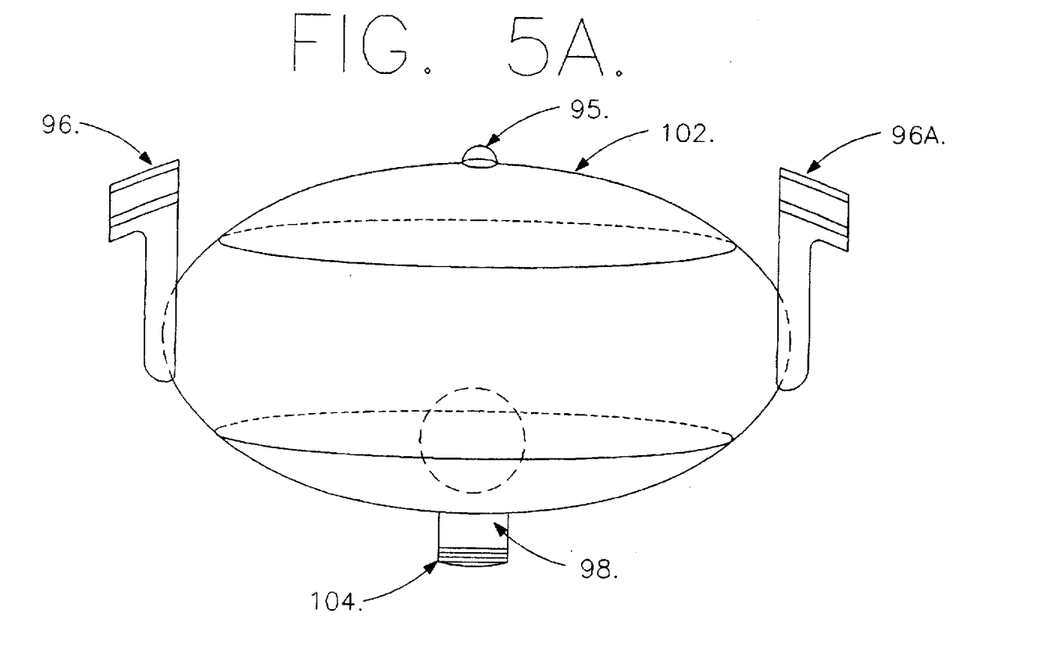
FIG. 5A shows an overview of the present inventions combinations attitude sensor/override control housing and the hardpoint location for the variable counter-weight.

FIG. 5 shows a version of a contact switch 100 that is to be used in the present inventions' combination attitude sensor/override control and variable counterweight, FIG. 5A, 102. This type switch is one of a plurality that goes into linning the inner surface area of device 102. The various locations of the switches represent different x and y coordinates. The switches are activated by the weight of a sphere 98 that rolls around inside the housing 102 in response to the movements of the present invention.

FIG. 5A shows a version of the present inventions' combination attitude sensor/override control and variable counter-weight, 102. This device serves as a "brain" so to speak of the present invention and provides a syncronization means for use with software programs not specifically written for it. The housing of 102 is shaped in the form of a bowl having a top and bottom surface that are concave and equal in size to one another. The housing of 102 is lined with contact switches representing x and y coordinates and are activated by the weight of sphere 98 that rolls around freely inside housing. The signals given off by the various switches is relayed to the CPU 70 for processing. A multi-port receptacle 95 is shown on top of the housing of 102. Two supports 96 and 96a are used as attachment means to connect device to inner motion control device 40. On the bottom surface of the housing for 102 is a threaded pipe 104 that provides an attachment means for adding more counterweight.

OPERATION

FIGS. 1, 2, 3, 4, 5

The motion control device pictured in FIG. 1 represents the "cornerstone" of the present invention, in a manner of speaking. The force that is at work and being manipulated is gravity. Much in the same way a hampster exercises, that is by running from within its' cage on a revolving wheel, the present invention shifts gravity. The technology that is at work here is no more complicated than slot cars that run on a track. The ball-bearing ballast 32 are slightly smaller than the circumference of the housing 10a. This is meant to prevent any binding of the cyclic motorized ballast and reduce any friction that might increase if allowed to come in contact with more than one surface. The motor is able to move forward of backward by commands given from the control stick and relayed thru the CPU. The motor 26 is kept in place on the track using a guide FIG. 1A, and four free wheeling tires positioned on top of its' carriage, FIGS. 1B–1C. In order to further assure that the ballasts do not bind, the sides of the ball-bearings have been flatened. This will allow for the linkages to clear the sides of the housing 10a. The number of ballast bearings is kept variable in consideration of the size and weight of the user. These variable adjustment measures also include an adjustable occupants chair for centering the users' body as close to the center of the sphere as possible along with a variable counter-weight positioned above the occupant.

While FIGS. 2 and 2A show the present inventions gimbal platform set=up and its' various componets, a good understanding of the shifting of gravity that takes place can be viewed from FIG. 3B. This drawing, showing the present inventions' platform from above, readily display how the inner motion control device 40 is responsible for shifting gravity in a left/right or east/west direction. In aeronautics this manuever is called a roll. The pivotal hardware that is associated with this motion is designated as 46 and 46a. The outer motion control device 50 is responsible for the up/down or north/south direction. The pivotal hardware associated with this is 54 and 54a. In aeronautic terms the continual upward motion and eventual rolling over backwards is termed a loop. Although the present invention will be able to perform what could be termed a reverse loop, I know of no such aircraft that can do this manuever in real time applications.

Applying this motion simulator, the present invention, to another format such as a race car. The various motion control devices take on new meaning. The inner motion control is responsible for mimicing the gravitational forces incurred while driving such as turning the steering wheel, (replaces control stick) either right or left. In order to mimic gravity in a right hand turn the ballast will have to travel to the left. In order to mimic a left hand turn the ballast will have to travel to the right. The outer motion control device mimics the gravitational forces incurred while under braking and down shifting along with the force of accelleration and up shifting. In an effort to make sure that the various manuevers performed by the present invention coincide with the motions viewed on the screen being used. A attitude sensor/ override control (FIG. 5A) has been designed. One of the purposes of which is to handle another set of variables that may not exsist when the present invention uses pre-existing software programs. In otherwords, certain manuevers that the present invention can do may be present in the graphics, possibly creating a syncronization problem. For example, the reverse loop mentioned earlier. The override control will prevent the user of the present invention from physically performing that manuever, if it is not written into the running program. In the same way but only reversed the attitude sensor is used to control the motion of the present invention without the CPU receiving any information for processing from the control stick. This feature will best be realized when a mistake is made by a user, causing them to crash. A intricate crach senario can now be written into the software, in which the present invention simulates the motion of this crash. The CPU gives commands to the ballast not the user and the attitude sensor works in conjunction with the CPU as a monitor of the present inventions movement. Future programs written exclusively for the present invention will now write more detailed crash sequences and the thrill of going thru the motions of a crash and walking away from it can be better realized. The attitude sensor and override control operate by a weighted sphere 98 rolling upon the various contact switches located throughout the inner surface area of the housing of 102. In this way syncronization is better realized between the movements of the present invention and the video or graphic display on the viewing screen.

In viewing FIGS. 4 and 4C a different platform is shown being used. The basic makeup of the present invention a skeletal sphere is enclosed using materials to form a hull. The hull is then placed a top of a pedestal of rotational bearings. This platform replaces the gimbal and like the gimbal allows the sphere to rotate in a plurality of directions. Batteries can be used to supply power to the various componets which are relatively the same in nature as the previous, preferred embodiment of the present invention.

SUMMARY, RAMIFICATIONS AND SCOPE

While I have shown two embodiments of my invention, a motion simulator, it should be apparent that further modifications thereof are possible within the terms of the following claim. For example, the motion control devices do not necessarily need housings for the motors and tracks. All that is needed is an attachment means for keeping the motor on the track while turning the sphere. The tracks provide a predetermined path for the motorized ballasts to travel on. In addition the motor could be made heavy enough to serve as the ballast itself, thus eliminating the ball-bearing weights or ballasts of the present invention.

Additional platforms to be used include replacing the legsupports of the gimbal platform with struts that provide attachment means by being anchored to a wall or ceiling, while suspending the sphere as before. The pedestal of rotating bearings can be replaced by a pedestal of air jets that provide a cushion of air on which to float.

Besides the obvious advantages of lower cost, lite weight and portability. There is the fact that the present invention can rotate its' occupant a full 360°, in a controlled and deliberate manner. A definite advantage when it comes to comparing the amount of reality that is physically simulated, by the present day simulators. With a wider range of motion possible the present invention provides a greater degree of thrill experienced by the user. The wider range of motion makes this ideal for flight applications as well as a plurality of other formats, making it multi-purposed. These formats include but are not limited to: race cars, off-road vehicles, motorcycles, hang gliders, sail planes, tanks, rollercoasters, powerboat, swamp buggies, helicopters essentually anything with wings or wheels, motors or engines.

In the area of sports training, formats such as skiing, provided of course the sphere is made large enough to stand in. Also in the area of sports theres luge training, river rafting and others.

Accordingly, the wider range of motion provides the user with a more realistic experience of crashing when making a mistake while playing a game written specifically for it. This would take place by removing the users ability to control the ballast at the moment of crashing. Programmed into the software are sequences of crashing motions that run the motorized ballast. Perhaps viewing a wall of flames the user is tumbled around momentarily, out of control so to speak. Again, this rotational ability of the present invention increases the thrill.

In the area of theme parks, rides that are equiped with the present invention can be programmed to control all movements and thus the present invention can be used as a vehicle for use by these them parks.

Although the description above contains many specificities, these should not be construed as limiting the scope of the invention but merly providing illustrations of some of the presently preferred embodiments of this invention. Thus the scope of the invention should be determined by the appended claims and their legal equivelents, rather than by the examples given.

I claim:

1. A motion simulator in the form of a motorized skeletal sphere for physically rotating, in a controlled and deliberate manner, an occupant, 360° in a plurality of directions, in conjunction with the use of video and graphic software programs, comprising:
 (a) two orbital tracks, configured perpindicular to each other to form said skeletal sphere and serve as predetermined paths,
 (b) two cyclic motorized ballasts, one for each said orbital track with attachment means to and for each said track, as a shifting means for controlling the center of gravity from within said skeletal sphere,
 (c) a pivotal platform as a support means for allowing said skeletal sphere to rotate freely, in a plurality of directions,
 (d) a variable counter-weight as adjusting means for off-setting occupants' weight and said motorized ballasts' weight from within said skeletal sphere.

2. The motion simulator of claim 1 wherein said skeletal sphere houses a chair for occupant.

3. The motion simulator of claim 2 wherein said chair is adjustable for centering occupants weight as close to the center of said skeletal sphere as is possible.

4. The motion simulator of claim 1 wherein the weight of said motorized ballasts are variable as a means of adjustment.

5. The motion simulator of claim 1 further comprising gimbal ring pivotally connected to said orbital tracks by locking hardware as folding means for storage.

6. The motion simulator of claim 1 wherein said pivotal platform is a gimbal.

7. The motion simulator of claim 6 wherein said gimbal platform is supported by legs that rest on the ground.

8. The motion simulator of claim 6 wherein said gimbal platform is suspended from overhead by struts as support means.

9. The motion simulator of claim 1 wherein said skeletal sphere houses a combination attitude sensor and override control as synchronization means between movement of said motion simulator and images projected on viewing screen.

10. A motion simulator in the form of a sphere for physically rotating in a controlled and deliberate manner, an occupant, 360° in a plurality of directions, in conjunction with video and graphic software programs, comprising:

(a) a spherical hull having access means to its' interior, for a human being, (b) two orbital tracks, configured perpindicular to each other within the circumference of said sphere as predetermined means for motorized ballasts' direction of travel, (c) variable hardware for affixing said orbital tracks to inner walls of sphere, (d) a chair affixed to said orbital tracks having adjustment means for centering said chair as close to the center of said sphere as possible, (e) two cyclic motorized ballasts, one for each said orbital track, with attachment means to end for each said orbital track, as a shifting means for controlling the center of gravity from within said sphere, (f) a pivotal platform as a support means for allowing said sphere to rotate freely, in a plurality of directions, (g) a variable counter-weight as an adjusting means for off-setting occupants' weight and said motorized ballasts' weight from within said sphere.

11. The motion simulator of claim 10 wherein said motorized ballasts' weight is variable as an adjustment means.

12. The motion simulator of claim 10 wherein said pivotal platform is a pedestal of rotating bearings, for said sphere to rest upon enabling said sphere to rotate freely in a plurality of directions.

13. The motion simulator of claim 10 wherein said pivotal platform is a pedestal of air jets, providing a cushion of air for said sphere to float upon and rotate freely in a plurality of directions.

14. The motion stimulator of claim 10 wherein said sphere houses a combination attitude sensor and override control as synchronization means between movements of said sphere and movements of images projected on viewing screen by software programs.

* * * * *